Patented Aug. 21, 1928.

1,681,185

UNITED STATES PATENT OFFICE.

JOSEPH HIDY JAMES, OF PITTSBURGH, PENNSYLVANIA, ASSIGNOR TO CLARENCE P. BYRNES, TRUSTEE, OF SEWICKLEY, PENNSYLVANIA.

METHOD OF TREATING PARTIAL OXIDATION PRODUCTS.

No Drawing.   Application filed November 5, 1919.   Serial No. 335,940.

In my copending application, Serial No. 435,355, filed January 6, 1921, for Partial combustion methods for treating aliphatic hydrocarbons I have disclosed processes for making intermediate oxidation products of aliphatic hydrocarbons from the open-chain hydrocarbons of petroleum, the petroleum distillates including the products of shale distillation or of low-temperature distillation of lignite or coals.

In the said process, the liquid hydrocarbon is vaporized, mixed with air or an oxygen-containing gas in regulated proportions, near the theoretical combining proportion or preferably in excess thereof; and the hot mixture is passed, with or without the addition of a diluting gas such as steam, through a relatively thin layer or through successive relatively thin layers of catalytic material under a regulated temperature, preferably below 500° C. The catalysts employed are preferably complex oxides or compounds of metals having a varying valence, such, for example, as the blue oxides of molybdenum. The products of this partial-combustion or partial-oxidation process are then condensed, giving a mixture of partial-oxidation products, ranging from alcohols, through aldehydes to aldehyde fatty acids. The process may be varied to produce more or less of the aldehyde fatty acids and of aldehydes.

These mixtures of partial oxidation products vary in composition depending on the conditions of the process, but usually contain aldehyde fatty acids and their waxes and anhydrides, aliphatic aldehydes, aliphatic alcohols and aldehyde alcohols, together with any hydrocarbons left unchanged or formed as a result of secondary reaction in the partial combustion process.

The foregoing mixtures formed from distillates through the kerosene and gas oil ranges are oily solutions, the various constituents being mutually miscible. By properly fixing the conditions of said process, I can obtain yields of aldehyde acids, free, combined, and as anhydrides to a total of over fifty per cent of the product.

The object of the present invention is to separate the aldehyde acids free, combined and as anhydrides, from the mixture, and also to form industrial or commercial products therefrom, such as soaps. By the term "aldehyde acids," I intend to cover either the free aldehyde acids or their waxes, or other combinations and their anhydrides. The aldehyde acids may be separated from the oily mixture either before, during or after the production of their soaps or compounds, and my broader claims are intended to cover their separations from the mixture in either way, although I prefer to produce soaps or compounds thereof in the same steps in which they are separated from the mixture.

Because of the oily character of the substances present other than the acids, the manufacture of soap therefrom presents certain difficulties. For example, if the direct production of the sodium soaps by the ordinary caustic soda boil be used, the soaps produced are partially soluble in the oily mixture, thus leading to a long and expensive series of washings and evaporations to obtain the soaps in the solid form. In addition to this, the caustic alkalies cause the polymerization of the aldehydic substances and the formation of dark colored products.

I have discovered a process by which these difficulties can be avoided or largely limited, and I will now describe a preferred form of my invention for separating the aldehyde acids and also making them into soap.

I first agitate the partial oxidation product mixture with slaked lime (calcium hydroxide) and water, preferably at a temperature near the boiling point of water, for a sufficient length of time to form the calcium soaps of both the free aldehyde fatty acids, the fatty acids combined as waxes and the fatty acids present as acid anhydrides. These reactions will take place very readily, owing, I believe, to the fact that the calcium soaps are insoluble, both in water and in the oily by-product mixture. A further advantage of this method lies in the fact that the calcium hydroxide, being less alkaline than caustic soda, does not cause so much of the polymerization and formation of dark colored bodies.

When the formation of calcium soaps has been completed, they are filtered out by any well known means, preferably on a suction filter. The suction should be carried on long enough to bring away the greater part of the oily material adhering to the solid calcium soap. Where high purity is desired, the solids should be removed from the filter, disintegrated by any suitable means and agitated so as to free the oil, causing it to float at the top. On filtering again, the calcium soaps will be obtained in a state of purity sufficient for commercial purposes. Repetition of such filtering and washing will give the desired purity, even where the oily impurities adhere tenaciously. For particularly difficult cases of purification, the calcium soaps may be washed quickly with gasoline, and this may be usually done directly on the filter.

It is evident that any metallic hydroxide, the metal of which will, in this combination, form an insoluble soap and which is sufficiently alkaline to have the desired saponifying action, will serve the same purpose as the calcium hydroxide. Such hydroxides may be those of magnesium, strontium, or barium. Other metals yielding insoluble soaps, such as aluminum or zinc, may also be used.

When the aldehyde fatty acids are thus obtained in the form of their calcium soaps and in a state of sufficient purity for commercial purposes, sodium or potassium soaps may be obtained therefrom in different ways, and I will now recite two methods therefor:

(1) The old method of obtaining sodium soaps from lime or calcium soaps may be applied, this consisting in the gradual addition of the calcium soaps to a boiling solution of sodium carbonate. In this process, calcium carbonate will form and settle to the bottom, while the sodium soaps, at first in solution, finally form to the point of saturation and separate from the solution whence they may be removed and dried in the usual manner.

In boiling the calcium soap with sodium carbonate, the soap may be carried to a point where substantially all of the calcium soap is decomposed, or it may be carried only to the point where a part of the calcium soap is decomposed, in which case, the remainder of the calcium soap will be mixed with the sodium soap.

The calcium carbonate formed is insoluble, and hence the final sodium soap may contain some calcium soap and some calcium carbonate; or the process may be carried out to practically free the sodium soap from the insoluble compounds. That is, the sodium soap may be "salted out" substantially free from the insoluble compounds, or all may be recovered in a single mixture, and this mixture has valuable detergent qualities and may be used for laundry or scouring soap.

(2) Another step for obtaining sodium or potassium soaps consists in decomposing the calcium soaps with a dilute mineral acid, such as sulphuric or hydrochloric acid or sulphuric acid followed by hydrochloric acid or mixtures of sulphuric and hydrochloric acids; forming the free fatty acids and the calcium salts of the mineral acids used. Care must be taken here that the calcium soap is fully decomposed, mechanical means being preferably employed to break up the solid calcium soaps so that the mineral acid solution will have complete access thereto.

The free aldehyde fatty acids thus formed may be further purified, if desired, by the so-called vacuum-steam distillation. Or the acids or their solution (in a solvent such as alcohol) may be filtered through such purifying material as has been used in the purification of the fatty acids derived from fats, such as treated bone-black, fullers' earth, special charcoal, etc.

In producing sodium or potassium soap from the acids freed in the manner last described, the final steps consist in the neutralization of the purified aldehyde fatty acids by the hydroxides, or preferably the carbonates, of sodium or potassium. Either the cold process or hot process may be used, the former giving the product a better color.

Instead of separating the aldehyde acids during or after the formation of compounds thereof from the mixture, they may be separated before forming their compounds. Thus the other constituents of the mixture, such as aldehydes and hydrocarbons which are more volatile than the aldehyde fatty acids, may be distilled off and the separated aldehyde acids then treated to form their compounds. The distillation may be carried out with or without either steam or other diluent.

In any of the forms, the other constituents of the oily mixture may be returned to the partial oxidation process for retreating and further conversion into aldehyde fatty acids.

I consider myself the first to separate the aldehyde acids free, combined or as anhydrides from the oily mixtures of partial combustion products above referred to which usually contain aldehyde alcohols, etc., and I consider myself the first to convert these aldehyde acids into soaps.

Many changes may therefore be made in the processes and sub-processes, as well as in the soap produced, without departing from my invention.

I claim:

1. In the treatment of aliphatic hydrocarbons which already contain artificially-introduced chemically-combined oxygen to different degrees of oxidation including aldehyde-like bodies and oxygenated organic acids, the steps consisting of separating the acids from the other constituents of the mixture, and forming salts of said acids.

2. In the method of treating a partial oxidation product of mineral oil containing aldehyde fatty acids and other less highly oxidized hydrocarbons, the steps consisting of separating the acids from the other constituents of the partial oxidation product, and forming soaps of said acids.

3. In the treatment of a liquid vapor-phase partial oxidation product containing alcohols, aldehyde-like bodies and oxygenated organic acids derived from aliphatic hydrocarbons, the steps consisting of separating the acids from the other constituents of the mixture, and forming soaps of said acids.

4. The method of treating a solution mixture of partial oxidation products of hydrocarbon oils containing aldehyde fatty acids of varying molecular weights, consisting in forming metallic salts of said acids and then separating them from the solution mixture.

5. The method of treating a solution mixture containing aldehyde fatty acids and aldehydes, consisting in separating the aldehyde fatty acids from the mixture and forming metallic soaps of said acids.

6. The method of treating a solution mixture containing aldehyde fatty acids of varying molecular weights and aliphatic aldehydes, consisting in separating the aldehyde fatty acids from the mixture and forming alkaline metal soaps of said acids.

7. The method of treating a solution mixture containing aldehyde fatty acids, consisting in converting the aldehyde fatty acids into substantially insoluble soaps and then forming soluble soap therefrom.

8. The method of treating a liquid mixture containing partial oxidation products of hydrocarbon oils including aldehyde fatty acids, consisting in converting the aldehyde fatty acids into substantially insoluble soap, separating the same from the oily mixture and then converting the insoluble soap into soluble soap.

9. The method of treating a liquid mixture containing partial oxidation products of hydrocarbon oils including aldehyde fatty acids, consisting in separating the aldehyde fatty acids from the mixture and converting them into soaps.

10. The method of treating a liquid mixture containing partial oxidation products of hydrocarbon oils including aldehyde fatty acids, consisting in separating the aldehyde fatty acids from the mixture and converting them into soluble soaps.

11. In the treatment of liquid partial oxidation mixtures of hydrocarbons including aldehyde fatty acids, the steps consisting of converting the aldehyde fatty acids into calcium soap, separating the calcium soap from the oily mixture and converting the same into soluble soap.

12. In the treatment of aliphatic hydrocarbons which already contain artificially-introduced chemically-combined oxygen to different degrees of oxidation including aldehyde-like bodies and oxygenated organic acids, the steps consisting of converting the acids into insoluble soap, separating said soap, and converting it into soluble soap.

13. In the treatment of aliphatic hydrocarbons which already contain artificially-introduced chemically-combined oxygen to different degrees of oxidation including aldehyde-like bodies and oxygenated organic acids for the production of soluble soaps, the steps consisting of converting the acids into insoluble soaps, separating said soaps, and recovering acids therefrom.

14. In the treatment of liquid partial oxidation mixtures of hydrocarbons containing aldehyde fatty acids, the steps consisting of converting the aldehyde fatty acids into substantially insoluble soaps, freeing the acids from the soaps and then converting the freed acids into soluble soaps.

15. In the treatment of liquid partial oxidation mixtures of hydrocarbons containing aldehyde fatty acids, the steps consisting of converting the aldehyde fatty acids into calcium soaps, freeing the acids from said soaps and then converting them into sodium soaps.

16. A soap containing a mixture of metallic salts of aldehyde fatty acids.

17. A soap containing a mixture of soluble metallic salts of aldehyde fatty acids.

18. A soap containing a mixture of salts of aldehyde fatty acids of varying molecular weights.

19. A soap containing a mixture of salts of oxygenated organic acids of different molecular weights.

In testimony whereof, I have hereunto set my hand.

JOSEPH HIDY JAMES.